No. 623,227. Patented Apr. 18, 1899.
G. VERONESE & A. GUADAGNINI.
COMPASS AND DRAWING INSTRUMENT.
(Application filed Feb. 23, 1897.)
(No Model.)
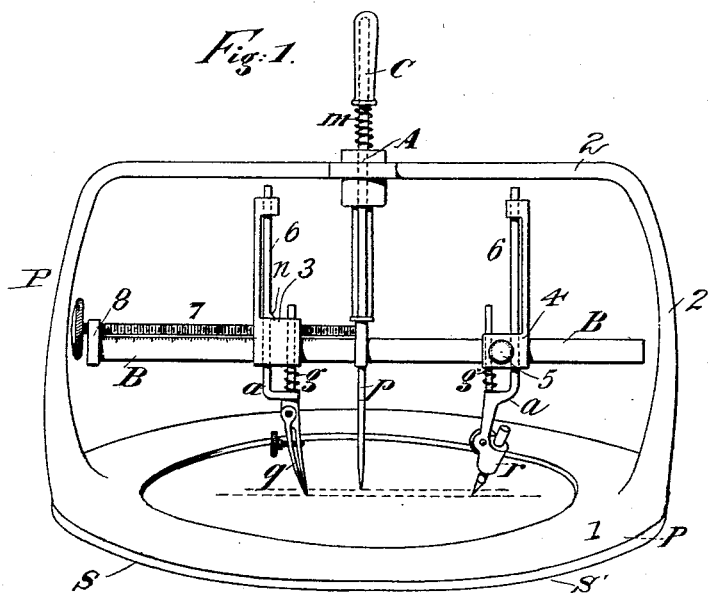
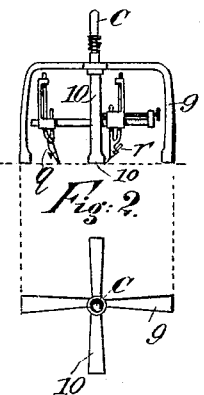
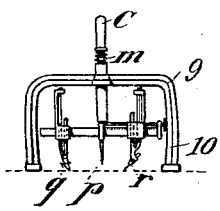
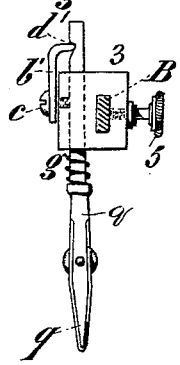
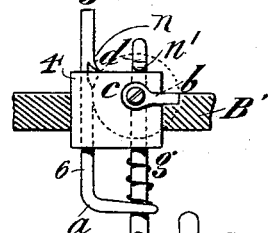
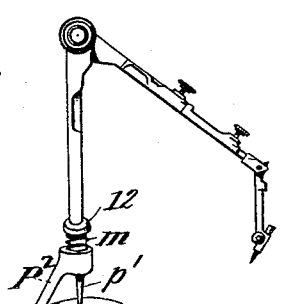
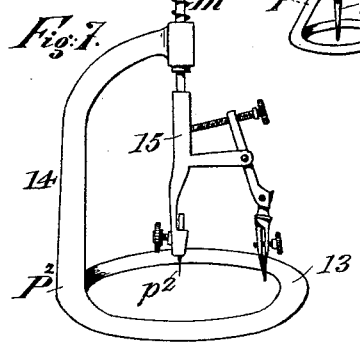
Witnesses:
H. C. Pinckney
C. Holloway
Inventors
Giovanni Veronese,
Alfonso Guadagnini
by J. E. M. Bowen Atty.

UNITED STATES PATENT OFFICE.

GIOVANNI VERONESE AND ALFONSO GUADAGNINI, OF BOLOGNA, ITALY.

COMPASS OR DRAWING INSTRUMENT.

SPECIFICATION forming part of Letters Patent No. 623,227, dated April 18, 1899.

Application filed February 23, 1897. Serial No. 624,613. (No model.)

*To all whom it may concern:*

Be it known that we, GIOVANNI VERONESE, fù Francisco, and ALFONSO GUADAGNINI, del fù Gaetano, subjects of the King of Italy, residing at Bologna, Kingdom of Italy, have invented certain new and useful Improvements in Compasses or Drawing Instruments, of which the following is a specification.

The object of this invention is to provide a drawing-compass by means of which the lines to be drawn by it can be executed with the greatest exactness and cleanness and without the necessity of perforating the paper.

To these ends our invention consists generally in providing the compass with a support on which the "central point" of said compass may be raised from or lowered to the paper or drawing-sheet and held out of contact with said paper or sheet.

In the accompanying drawings, Figure 1 illustrates a perspective view of a compass embodying our improvements and in which the pencil-carrier and ruling-pen are each adjustably supported on a bar extending laterally from the central point or needle-carrier. Fig. 2 shows an elevation and plan of a similar compass to that illustrated in Fig. 1, but on a much smaller scale and with the support for the compass composed of two crossed arches or bridges, one of which can be folded on the other. Fig. 3 is an elevation of the compass shown in Fig. 2 and with the inner arch of the support folded upon the outer one. Figs. 4 and 5 are details of the pen or pencil-carrier. Figs. 6 and 7 are perspective views of different forms of compasses from those shown in the other figures.

Similar letters and numerals represent like parts in all the figures.

P in Fig. 1 is the support for all the parts of the compass when in use. This support consists of a circular base-plate or ring 1 and a bridge or arch 2, extending upward from said plate.

A is a vertical rod which constitutes the rotation-axis or needle-carrier and which passes loosely through the bridge 2 at a point above the center of the ring 1 and is provided at its lower end with the central point or needle $p$.

C is the rotation-handle of the needle-carrier A, and $m$ is a coil-spring encircling the carrier A between the bridge 1 and handle C and which unless depressed bears upward said handle and carrier with its point or needle $p$ above the plate 1. Extending at right angles from the needle-carrier A is a cross-bar B for supporting the tracing-pen and the pencil-holder.

3 and 4 are blocks supported by the bar B on opposite sides, respectively, of the carrier A and on which bar said blocks are adapted to slide and be adjusted by screws 5, passing through the blocks and impinging against the bar. The shanks of the ruling-pen $q$ and pencil-holder $r$ pass vertically and loosely through the respective blocks 3 and 4, and each shank is provided with an angle-rod 6, having an elbow $a$ near its lower end, the vertical portions of which rod are parallel with said shanks and also pass loosely through the blocks 3 and 4. Surrounding the shank of the pen $q$ and between the angle-rod 6 and block 3 is a coil tension-spring $g$, which tends to bear said angle-rod and pen downward. A similar spring and acting similarly surrounds the shank of the pencil-holder $r$.

7 is a rotary screw-rod journaled, respectively, in the needle-carrier A and in a bracket 8, which extends from the bar B, and said rod passing through a female screw-thread in the block 3. This rod 7 by its rotation serves to adjust the distance of the pen $q$ from the needle or central point $p$.

As hereinafter stated, the normal position of the needle $p$ when the ring is resting on the drawing-paper is above said ring, and consequently above the paper, the spring $m$ acting to keep the needle in said raised position. The pen and pencil, however, will be pressed down upon the paper by their springs $g$.

In the use of the compass the ring 1 is placed on the paper or drawing in its proper position, which may be determined by pressing down on the handle C until the point of the needle $p$ touches the center of the arc or circle to be drawn, and at the same time the pen $q$ and pencil $r$ can be raised from contact with the paper by lifting up the two elbows $a\ a$ with the fingers. Now if it be desired to draw either with the pen $q$ or pencil $r$ the one not needed is raised by its elbow $a$, and a slight pressure on the handle C and a rotation of the same will cause said pen or pencil to draw the arc or circle, the spring $g$ serving to bear upon the paper with a uniform pressure.

From the above it will be seen that the drawing can be accomplished without perforating the paper, as the bearing-point on which the pen or pencil revolves is above the paper and on the bridge 2.

Instead of the support being made of a base-plate and one arch or bridge, as shown in Fig. 1, it may be made of two crossed arches or bridges 9 and 10, as shown in Figs. 2 and 3, and so that the inner arch or bridge 10 can swing around and fold under the bridge 9 (see Fig. 3) when not in use and be swung around at right angles to the arch 9, as shown in Fig. 2, when required for use.

Figs. 4 and 5 show means for locking the pen or pencil in a raised position. In Fig. 4 the shank of the pencil-holder is provided with a lateral projection $d$, and a finger $b$, pivoted to the block 4, is adapted to be swung under said projection when the arm 6 is raised, and thus retain it and the pencil in such position. In Fig. 5 a notch $d'$ is in the shank of the pen $q$, and a bent finger $b'$, pivoted to the block 3, is adapted to engage with said notch when the pen is raised. In Fig. 4 the pencil-holder is shown in its lowest position, the finger $b$ being unlocked from the projection $d$, and in Fig. 5 the pen $q$ is shown locked in its raised position. The limit of the downward play of the pen or pencil is reached when a shoulder $n$ on the arm 6, Fig. 1, or shoulder $n'$ on pencil-shank (see Fig. 4) rests upon the block 3 or 4.

In Fig. 6 the support P' is composed of a circular or open base-plate 11 and one upright arm having a hole in its upper end through which the needle or "center point" $p'$ passes, the support P' being only of a size sufficient to give a steady rest to said point. The spring $m'$ surrounds said point between said support and a shoulder 12 on the arm of the compass above the point $p'$. In Fig. 7 the support P² is also composed of a circular base-plate 13 and an upright arm 14, in which is a hole directly over the center of the ring or plate 13, and the circular shank of the needle-holder 15 passes through said hole, the spring $m$, as in Fig. 1, between the arm 14 and handle C tending to keep the needle $p^2$ out of contact with the paper.

What we claim as new, and desire to secure by Letters Patent, is—

1. The combination with the drawing-compasses, of a support or base adapted to rest on the drawing or table, the central-point carrier freely passing through said support, and means for normally maintaining the central point in a raised position, substantially as set forth.

2. The combination with the drawing-compasses, of a support adapted to rest upon the drawing or table, and the central point and tracing-points suspended from the upper portion of said support, means for normally maintaining the central point in a raised position above the drawing, means permitting the tracing-points to be raised, substantially as set forth.

3. The combination with the drawing-compasses, of a support adapted to rest on the drawing or table, the central-point carrier freely passing through said support, and adapted to slide therein, and a spiral spring situated between said support and the rotating handle of the needle-carrier, for bearing said handle and carrier upward, substantially as set forth.

4. The combination with the drawing-compasses, of a support adapted to rest upon the drawing or table, and the central point and tracing-points suspended from the upper portion of said support, means for normally maintaining the central point in a raised position above the drawing, and tension-springs normally bearing said drawing-points downward, substantially as set forth.

5. The combination with the drawing-compasses, of a support adapted to rest upon the drawing or table, and the central point and drawing-points suspended from the upper portion of said support, and said points adapted to be raised and lowered, means for normally maintaining the central point in a raised position above the drawing, and means for locking the drawing-points in their raised positions, substantially as set forth.

Signed at Bologna, Italy, this 10th day of October, 1896.

GIOVANNI VERONESE.
ALFONSO GUADAGNINI.

Witnesses:
VIRGINIA VENTURA,
ALFONSO RIZZIR.